April 4, 1967     J. N. SCOTT, JR     3,312,765
METHOD FOR MAKING MOLDED THERMOPLASTIC PIPE FITTINGS
Filed Dec. 26, 1963     2 Sheets-Sheet 2
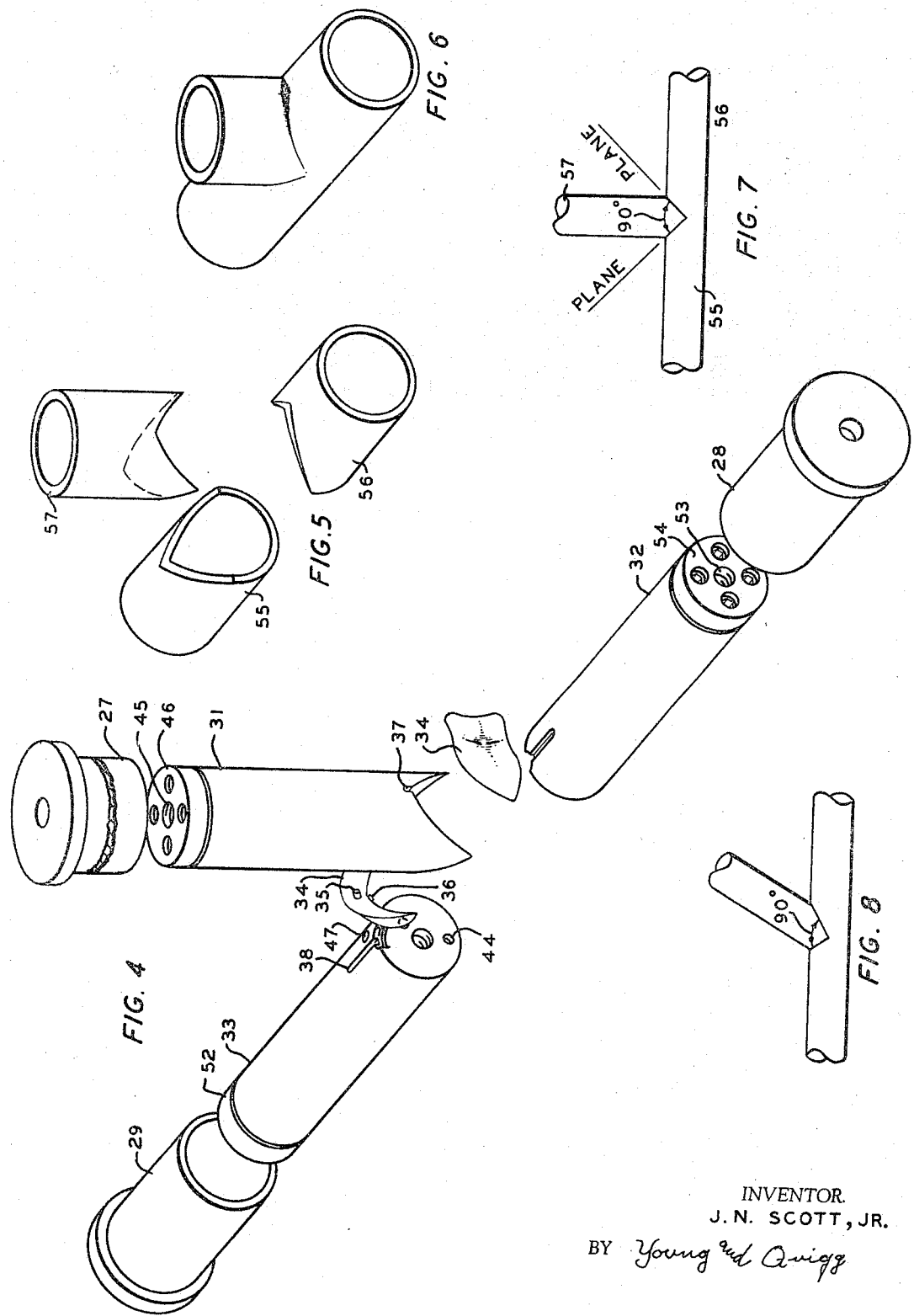
INVENTOR.
J. N. SCOTT, JR.
BY Young and Quigg
ATTORNEYS United States Patent Office 3,312,765
Patented Apr. 4, 1967

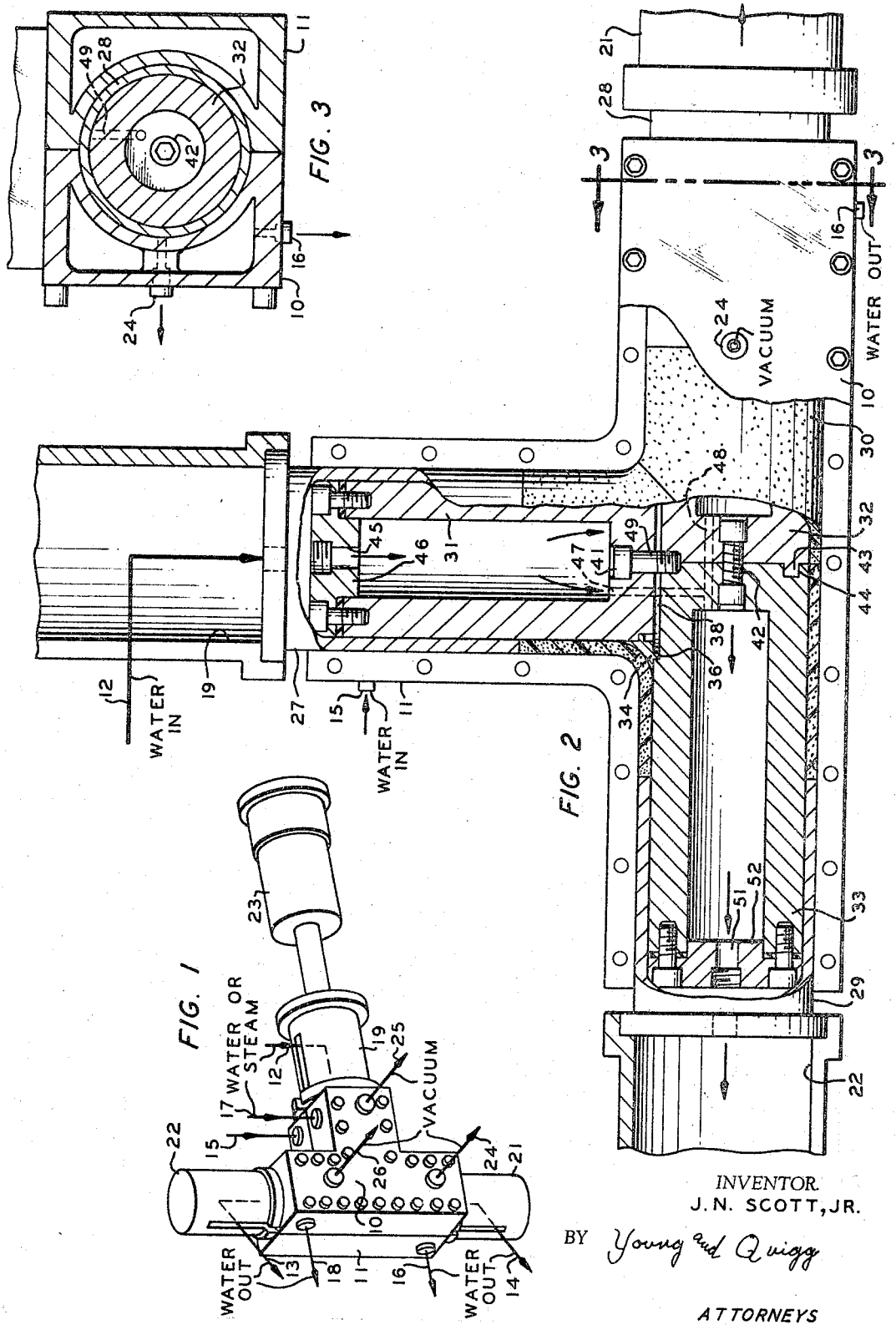

3,312,765
METHOD FOR MAKING MOLDED THERMO-
PLASTIC PIPE FITTINGS
John N. Scott, Jr., Bartlesville, Okla., assignor to Phillips
Petroleum Company, a corporation of Delaware
Filed Dec. 26, 1963, Ser. No. 333,306
5 Claims. (Cl. 264—152)

This invention relates to a novel thermoplastic pipe fitting and to a novel method for making thermoplastic pipe fittings. In one of its more specific aspects the invention relates to a method for making molded thermoplastic fittings from thermoplastic materials having low melt index values.

It is disclosed in Hogan et al. U.S. Patent 2,825,721, that unique polymers and copolymers can be produced by contacting one or more olefins with a catalyst comprising as an essential ingredient chromium oxide, preferably including a substantial amount of hexavalent chromium. The chromium oxide is associated with at least one other oxide selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide-containing catalyst. The temperature for the polymerization reaction is usually in the range of about 100 to about 500° F. with a temperature in the range of 275 to 375° F. being often preferred for the polymerization of ethylene. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of olefins which are insoluble in the hydrocarbon diluent. This polymer is formed in association with the polymerization catalyst, and is suspended in the liquid diluent in solid particle form. An example of a homopolymer of ethylene is disclosed in Wilkins, U.S. Patent 3,035,958, issued May 22, 1962. The term "particle form polymer" will be employed to designate an olefin polymer or copolymer formed as a particulate solid in a diluent at the conditions of polymerization.

Another suitable but nonequivalent method of producing highly crystalline, high density polymers comprises contacting an olefin such as ethylene, propylene, 1-butene, and the like, with a two or more component catalyst wherein one component is an organometal compound, including those where one or more but not all organo groups is replaced by a halogen; a metal hydride; or a metal of Group I, II or III; and the second component is a Group IV to VI metal compound, e.g., salt or alcoholate. A third catalyst component which can be used advantageously is an organic halide or metal halide where the organic radical has thirty or less carbon atoms, and is advantageously an alkyl, cycloalkyl or aryl group. These catalysts are more fully discussed in the patent of W. B. Reynolds et al., Patent No. 2,886,561, issued May 12, 1959, and specific examples of such compounds are disclosed therein. The reaction using these catalysts is preferably carried out in the presence of a hydrocarbon diluent in liquid phase at a temperature in the range from room temperature up to about 300° F. Polymers produced in the presence of these catalysts have molecular weights which can range from 10,000 to 200,000 or higher. They generally have crystallinities of the order of 80 to 85 percent and densities of about 0.950.

Particle form polymer can be prepared from olefin monomers, such as ethylene and propylene and from mixtures of ethylene and/or propylene with other saturated hydrocarbons, for example, mixtures of ethylene with minor amounts of higher 1-olefins, such as propylene, 1-butene, 1-pentene, 1-hexene, and the like. Examples of comonomers which can be used with ethylene and/or propylene include 1-olefins having no branching nearer the double bond than the 4-position and conjugated and non-conjugated diolefins, such as 1,3-butadiene, 1,4-pentadiene, 1,5-hexadiene, dicyclopentadiene, and the like. The polymerization reaction is carried out in the presence of a liquid hydrocarbon diluent which is inert in the polymerization reaction and in which the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. It is also within the scope of the invention to employ as a diluent the monomer being polymerized, for instance, propylene is polymerized in liquid propylene. The polymerization reaction temperature will vary depending on the particular liquid diluent which is employed and on the olefin reactants and catalyst. Usually, however, when using a chromium oxide catalyst, polymerization is carried out at 230° F. and below, preferably between about 225° F. and about 150° F. The olefin reactants are contacted in the polymerization zone with a suspension of the subdivided chromium oxide catalyst in the liquid hydrocarbon diluent under the aforementioned temperature and under pressures suitable to maintain the diluent in the liquid phase. Concentration of the catalyst in the reaction zone can vary widely; however, generally it will be in the range of 0.0001 to 5 percent by weight based on the liquid hydrocarbon diluent.

Polymers made by the particle form process are particularly valuable for the manufacture of pipes and tubing used to transport fluids, particularly fluids which are corrosive to metals and other materials ordinarily used for fabricating pipes. Particle form polymers generally have very low melt index values. The melt index is a measure of the flow properties of the molten polymer. A low melt index value indicates high viscosity of the molten polymer. The low melt index properties of the particle form polymers have presented problems in the fabrication of shaped articles because the polymer, even when molten, is too viscous for conventional molding techniques such as injection molding.

I have discovered that the problem of fabricating molded articles such as pipe fittings from particle form polymers and other polymers having a relatively low melt index can be solved by pieces of particle form polymer pipe fitted together so as to make a preform of the desired fitting and then fusing the pieces in a mold under pressure and at about the melting temperature of the polymer. According to the method of the invention, the plasticized polymer is required to flow a very short distance, e.g., only the distance necessary to fuse with the adjacent plasticized polymer. The pieces of polymer pipe which make up the preform are already densified and there are substantially no voids to be eliminated.

Olefin polymers, such as those made by the Hogan et al. method including particle form polymers, melt over an appreciable temperature range, apparently because the individual crystals melt at different temperatures. The melting point is usually considered the temperature at which the last crystal is melted when the temperature of the polymer is raised at a controlled rate. The melting temperature range for the olefin polymers of this invention will usually be about 270 to 285° F. Articles can be molded according to the present invention at any temperature within or above the melting temperature range. The melting temperature range and the melting point can readily be determined for olefin polymers. The polymer gradually becomes clear and plastic through the melting temperature range. The birefringence melting point method using the Kofler micro hot-stage apparatus is one convenient method for determining the melting range of an olefin polymer.

The method of the invention can be utilized in molding thermoplastic materials in general but is particularly applicable for molding polymers having a melt index (ASTM D–1238–57T Condition E) of less than 0.2. Polymers having a melt index of less than 0.2, as above, are identified by High Load Melt Index (ASTM D–1238–57T Condition F). Particle form polymers utilized in making pipe and tubing will usually have a high load melt index (HLMI) of about 1.5 to 3.0 which would be 0 at Condition E of the ASTM method. The particle form polymer is too viscous to flow through the orifice of the test apparatus at Condition E of the ASTM method.

It is an object of this invention to provide a method for fabricating pipe fittings from thermoplastic material. It is a further object to provide a method for fabricating pipe fittings from thermoplastic materials having relatively low melt index values. It is also an object of this invention to provide a method for making molded articles of particle form olefin polymers wherein the material being molded is not required to flow any appreciable distance. It is still another object of this invention to provide a method for fabricating molded articles from densified particle form polymer so that the need for removing voids from the polymer in the molding operation is obviated. Other objects and advantages of the invention will be apparent to one skilled in the art upon studying this disclosure including the detailed description of the invention and the appended drawing wherein:

FIGURE 1 is a perspective view of a mold assembled according to the invention;

FIGURE 2 is a sectional elevation of a mold assembled according to the invention;

FIGURE 3 is a view along line 3—3 of FIGURE 2;

FIGURE 4 is an exploded view of a core assembly according to the invention;

FIGURE 5 illustrates sections of thermoplastic pipe to form a preform for use in the mold of FIGURES 1 and 2;

FIGURE 6 illustrates a fitting made according to the invention;

FIGURE 7 illustrates the construction of a T; and

FIGURE 8 illustrates the construction of a Y.

Referring now to FIGURE 1, a mold is shown assembled for making a thermoplastic T fitting illustrating the relationship of the assembled mold halves 10 and 11; the water or steam inlets 12, 15, and 17; water or steam outlets 13, 14, 16, and 18; sleeve pressure caps 19, 21, and 22; fluid ram 23; and vacuum ports 24, 25, and 26. Fluid rams (not shown) similar to fluid ram 23 can be applied to sleeve pressure caps 21 and 22 or these pressure caps can be placed between the jaws of a press, vice or other suitable means for urging the pressure caps 21 and 22 inwardly.

The elements which go to make up the mold assembly of FIGURE 1 are shown in greater detail in FIGURE 2. Sleeve pressure cap 19 urges core sleeve 27; pressure cap 21 urges core sleeve 28; and pressure cap 22 urges core sleeve 29 into the assembled mold halves 10 and 11 against the fitting 30 being molded. Core elements 31, 32, and 33 maintain the interior configuration of the fitting 30. Fillets 34 serve to convert the angle generated at the intersection of core section 31 with core sections 32 and 33 to an arc so as to avoid a sharp angle or abrupt change of direction of the wall of the fitting 30. The interior surfaces of mold halves 10 and 11 are shaped to coincide with the configuration provided by the fillets 34 so that the wall thickness of the fitting is substantially constant in the runs of the fitting as well as at the intersecting junctions of the runs of the fitting. As the mold core elements are assembled, the fillets 34 seek their proper position by means of pins 35 and 36 which are slidably engaged in keyways 37 and 38. The core elements 31, 32 and 33 are secured together in their assembled position by means of threaded bolts 41 and 42. Core members 32 and 33 are maintained in their proper positions radially by means of pin 43 and opening 44.

Heating and cooling fluid, e.g., steam or water, circulates through the interior of the assembled core via conduit 12, inlet 45 in cap 46 of core member 31 through connecting passageways 47, 48 and 49 in core members 31, 32 and 33. Fluid exits the core via port 51 in cap 52 of core member 33 and a similar port 53 in cap 54 of core member 32 (shown in FIGURE 4).

One method for cutting sections of thermoplastic pipe to construct a fitting preform is shown in FIGURE 5. A notch is cut in the side of a section of thermoplastic pipe which extends half way through the pipe. The section of pipe can then be cut in two to form the sections 55 and 56 of FIGURE 5. Another section of pipe is cut at one end to fit into the notch to form the other run of the fitting as illustrated at 57. A finished fitting is shown in FIGURE 6. The notch cut in the first pipe section will always have an included angle of 90 degrees and will extend half way through the pipe section, i.e., the included angle of 90 degrees will always be at the longitudinal axis of the pipe section. When a line which bisects this included angle of 90 degrees is normal to the longitudinal axis of the pipe section, the fitting will be a T and when a line which bisects the included angle of 90 degrees is not normal to the longitudinal axis of the pipe section, the fitting will be a Y. Examples of such fittings are shown in FIGURES 7 and 8.

An L can be molded by substituting a suitable member for either core section 32 or 33.

The following example will be helpful in attaining an understanding of the invention but should not be construed as limiting the invention.

*Example*

A 2 inch T preform was made by cutting 2 inch pipe into the shapes shown in FIGURE 5 so that the pieces fit closely together in the form of a T. The 2 inch pipe was extruded from a particle form copolymer of ethylene and 1-butene containing about 3 weight percent 1-butene and having a melt index (HLMI) of 1.9. The density of the polymer, containing 10 weight percent carbon black, was 0.955. The pieces were fitted together as closely as possible over the cores 31, 32 and 33 with the fillets 34 in position and the cores were secured together. The cores with the preform in place were placed in one mold half, covered with the other mold half and the mold halves were secured together. The mold was then heated to 280° F. for about 1 hour to insure temperature equilibrium throughout the polymer. The mold cavity was then evacuated through vacuum ports 24, 25 and 26 and about 2000 p.s.i. pressure was applied to pressure caps 19, 21 and 22. The pressure was maintained and cooling water was circulated through the mold until pressure decay due to polymer shrinkage ceased. The pressure and cooling were then terminated, the mold was opened and the molded T was removed.

The finished T had a glossy surface and a smooth junction where the runs of the T meet. The fitting did not leak when pressure tested at pressures of expected use.

A feature of the invention is in the use of the fillets 34 which avoid a sharp change of direction of the walls of the fitting. The fillets also can be utilized to increase the wall thickness of the fitting at the junction of the runs of the fitting. The preform method is also applicable to the molding of articles other than pipe fittings.

That which is claimed is:

1. The method of molding pipe fittings of particle form ethylene polymer having a high load melt index of about 1.5 to 3.0 which comprises cutting sections of said polymer pipe to fit together to form a preform having substantially the configuration of the desired fitting; placing the fitted preform in a mold having the configuration of the desired fitting; subjecting the preform to molding pressure of at least about 2000 p.s.i. at a temperature of at least 280° F.; and maintaining said molding pressure until polymer shrinkage ceases.

2. The method of molding a pipe fitting from a thermoplastic pipe of particle form methylene polymer having a high load melt index of about 1.5 to 3.0 which comprises cutting a notch in the side of a first section of said thermoplastic pipe having an included angle of 90 degrees and a depth equal to the radius of the pipe; cutting the end of a second section of said pipe so as to fit into said notch; placing said sections together in a mold having the configuration of the fitting with the cut end of said second section fitted into the notch in said first section; subjecting said sections in said mold to molding temperature of at least about 280° F. and pressure of at least about 2000 p.s.i. for a time sufficient to fuse the sections of said pipe together and to convert the angle generated at the intersections of the sections into an arc; and maintaining the molding pressure until shrinkage ceases.

3. The method of claim 2 wherein the included angle of 90 degrees is in the center of the notch in the first section of pipe and the fitting is a T.

4. The method of claim 2 wherein the included angle of 90 degrees is spaced from the center of the notch in the first section of pipe and the fitting is a Y.

5. The method of claim 2 wherein the first section of pipe is out in two at the angle of the notch.

References Cited by the Examiner
UNITED STATES PATENTS

| | | | |
|---|---|---|---|
| 1,755,899 | 4/1930 | Root | 284—423 XR |
| 2,118,893 | 5/1938 | Meerbeck | 264—248 XR |
| 2,670,313 | 2/1954 | Young | 264—248 XR |
| 3,022,209 | 2/1962 | Campbell | 285—423 XR |
| 3,200,442 | 8/1965 | Haller | 18—16.5 |

ROBERT F. WHITE, *Primary Examiner.*

T. J. CARVIS, *Assistant Examiner.*